3,335,313
SPARK EROSION DEVICE WITH CONTROLLABLE
ELECTRODE SPACING
Gerrit Luimes and Cornelis van Osenbruggen, both of Emmasingel, Eindhoven, Netherlands, assignors to North American Philips Company, Inc., New York, N.Y., a corporation of Delaware
Filed Dec. 31, 1963, Ser. No. 334,879
Claims priority, application Netherlands, Jan. 9, 1963, 287,562
5 Claims. (Cl. 314—89)

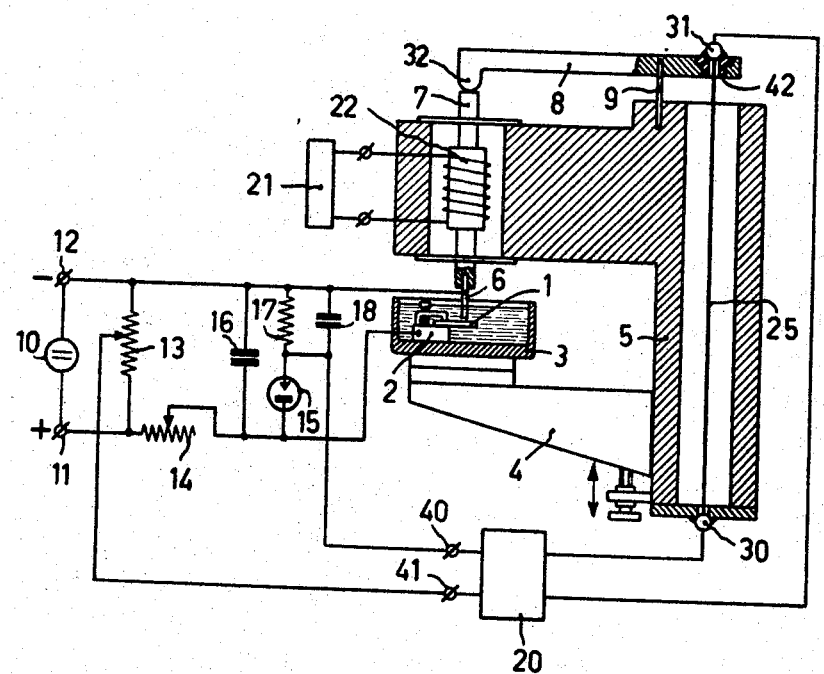

The present invention relates to a spark erosion device for processing metals. More particularly, to a spark erosion device in which the distance between two electrodes, one of which is the workpiece, is adjusted both by a coarse control and a fine control, the latter being correlated with an electrical control quantity such as the mean current or voltage across the working area.

With a known device the coarse adjustment of the distance between the electrodes is derived from a driving member mechanically coupled with a motor, said member being capable of moving one electrode (the work electrode) during the operation towards the other electrode (the workpiece) or in a direction opposite thereto. The fine adjustment is performed by means of a solenoid which is traversed by a current which depends upon the mean electrode current. The solenoid attracts an electrode holder rigidly connected with the work electrode, which electrode is, moreover, subjected to a force derived from a spring in a direction opposite the direction of attraction. This fine adjustment has the disadvantage that the forces exerted on the work electrode are fairly large owing to the comparatively large mass of the electrode holder and the ancillary members associated therewith. A further disadvantage consists in the possibility of movement of the work electrode due to the requirement to provide an air gap between the solenoid and the electrode holder. With the usually small distance between the work electrode and the workpiece the operation of the device may thus be disturbed, if due to inertia the work electrode should come into contact with the workpiece, which might readily give rise to damage, particularly of the work electrode.

The invention, which has as its object to provide a micro spark erosion device, in which the electrodes are relatively displaced over very small distances, mitigates the aforesaid disadvantages by utilizing the thermal expansion of a metal wire, which is included with the work area in a mechanical circuit. The fine adjustment of the distance between the electrodes is obtained by passing a control current through the metal wire.

The invention is characterized in that for the fine adjustment use is made of a metal wire, coupled mechanically with the movable electrode and traversed by a current which depends upon an electric control quantity such as the mean current or voltage across the working area.

In accordance with a further aspect of the invention, the working area is the sole interruption of an otherwise closed, mechanical circuit. The enlargement or the reduction of the working area is therefore the sole degree of freedom of the circuit.

The control-current, which varies in a sense opposite to the mean current or voltage across the working area, provides such a variation in length of the metal wire that the desired distance between the work electrode and the workpiece is maintained.

This method of distance control is distinguished from the known adjustments by the comparatively high, rapidly reacting control force exerted on the work electrode, whilst the inertia forces involved do not affect the movement of the work electrode owing to the rigidity of the system. The metal wire permits the application of considerable forces for the movement of the work electrode in an adequate control-range with a negligible inertia.

It should be noted that it is known per se to produce mechanical movements with the aid of a hot-wire. However, the current passing through the hot-wire is not correlated with the current or voltage between a workpiece and an electrode.

The invention will be described by way of example with reference to the embodiment shown diagrammatically in the figure.

As shown in the figure, the work piece 1 is clamped in the work piece holder 2, which is arranged in a vessel 3 containing a non-conductive liquid. The vessel 3 is rigidly secured to a sledge 4, which is adapted to move up and down along the stationary column 5.

The distance between the workpiece 1 and the work electrode 6 can be adjusted by means of the displaceable sledge 4 in a coarse manner. The electrode 6 is fastened to an electrode holder 7, which bears on an arm 8, which is connected substantially rigidly via a leaf spring 9 with the upper side of the column 5.

The voltage required to produce spark erosion is derived from a regulated direct-voltage source 10. During the spark discharges the workpiece 1 constitutes the positive electrode and the electrode 6 is the negative electrode. The electrode current is limited by the variable resistor 14. In accordance with the invention, a metal wire 25 provides the fine adjustment of the electrode spacing. To this end the metal wire 25 is rigidly connected at its end 30 with the lower side of the column 5 and at the end 31 with the arm 8. The end 31 and hence the whole wire 25 is insulated from the conducting arm 8 by means of a non-conductive sleeve 42. The fastening area 31 on the arm 8 and the supporting point 32 of the arm 8 on the electrode holder 7 are located on either side of the contact area of the arm 8 and the leaf spring 9. Thus a lever effect is obtained. When the point 31 moves upwardly due to the expansion of the wire 25, the point 32 moves downwardly so that the distance between the electrodes 1 and 6 is reduced. Conversely, the distance is increased when the wire 25 shrinks.

The variation in length of the wire 25 is obtained as follows. Owing to the effect of the spark erosion the distance between the electrodes 1 and 6 increases. The mean electrode current and hence the voltage drop across the resistor 14 thus decreases. The capacitor 18 of the RC combination 17, 18 is charged via the diode 15. The mean potential of the input terminal 40 of the amplifier 20, connected to the junction of the RC-combination and the cathode of the diode 15 is therefore determined by the RC time constant of the combination 17, 18 and the anode voltage of the diode 15. If the distance between the work electrode 6 and the workpiece 1 increases, and hence the mean electrode current decreases, the anode voltage of the diode 15 increases, so that the mean potential of the input terminal 40 also increases. The input voltage of the amplifier 20 increases and hence the output current, passing through the metal wire 25 increases, which results in an expansion of the wire 25. Owing to the leverage the contact point 32 and hence the electrode 6 move downwardly, so that the initial distance between the work electrode and the workpiece is restored.

The expansion of the metal wire 25 is determined only by the temperature thereof. Owing to the comparatively small mass the variation in length follows the variation in current across the wire with a small delay. The movements of the electrode 6, which are only determined by the behavior of the metal wire 25, are therefore completely defined and the contact between the work electrode and the workpiece does not occur. The spring 9 of high rigidity permits of applying comparatively heavy control-forces. This adjustment permits operations to be carried out in which there is a very small mean distance between the workpiece and the electrode, so that workpieces of small dimensions can be shaped.

It has been found to be advantageous to superimpose an oscillatory motion of small amplitude on the movement of the electrode 6 towards the workpiece 1. This increases the speed and the accuracy of the operation. The oscillatory motion may be obtained by means of the energization of a coil 22 wound on a ferro-magnetic part of the electrode holder 7 from a low-frequency oscillator 21. The amplitude of the vibrations is independent of the adjustment of electrode 6 by the wire 25 and the frequency thereof is independent of the frequency of the spark discharges.

In one embodiment the workpiece 1 was formed by a metal foil in which holes of a depth of 200μ and a diameter of 10μ had to be made by spark erosion. The hot-wire 25 was made of a chromium-nickel alloy and had a length of 25 cms. The maximum expansion of the wire was about 100μ. The ratio between the arms of the lever 8 was 2:5, so that the pitch depth of the electrode 6 was about 250μ. The mean distance between the workpiece 1 and the electrode 6 was about 1μ. The electrode 6 was made of tungsten and had a diameter of 8μ.

The direct-voltage source 10 supplied a voltage of 50 volts. The potentiometers 13 and 14 had values of 1 mohm and 4 kohms, respectively. The resistor 17 had a value of 0.5 mohm. The capacitor 18 had a value of 470 picofarads. The capacitor 16 had a value of about 30 picofarads. The diode 15 was a vacuum diode of the type EY 84. The output current of the amplifier 20 varied between 0 and 2.5 amps when the input voltage varied between 0 and 10 volts.

The frequency of the oscillator 21 could be adjusted between 40 and 100 c./s. The associated vibratory amplitude of the work electrode 6 was a fraction of the spark gap.

In principle the same adjustment of the working area could be obtained by passing the current of the working area directly through the hot-wire. Then the fastening point 31 of the hot-wire and the supporting point 32 with respect to the leaf spring 9 must be located on the same part of the arm 8. In practice, this method is found not to yield the best results since the current across the working area is not properly matched to the current passing through the heating wire.

What is claimed is:

1. Spark erosion apparatus comprising a first movable electrode, a second electrode workpiece, means for positioning said second electrode in operative proximity to said first electrode to define a gap work area therebetween, a source of electrical energy, means for coupling said energy source to said first and second electrodes in a manner to produce a spark discharge therebetween when said electrodes are positioned in said operative proximity to each other, means for adjusting the gap between said electrodes to a predetermined spacing, said adjusting means comprising a metal wire coupled to said movable electrode and arranged to conduct a heating current to produce a change in length of said wire, electric sensing means comprising a diode and resistor serially connected across said electrodes and a capacitor connected in parallel with said resistor thereby to produce a control voltage at said capacitor which is determined by the mean value of current in said work area, and means responsive to said control voltage for varying the current in said wire inversely with said mean value of work area current thereby to vary said wire length in a sense to maintain said predetermined spacing substantially constant.

2. Spark erosion apparatus comprising a first electrode, a second electrode workpiece, at least one of said electrodes being movable, means for positioning one of said electrodes in operative proximity to the other electrode to define a gap work area, a source of electrical energy, means for coupling said energy source to said first and second electrodes in a manner to produce a plurality of repeated spark discharges therebetween when said electrodes are positioned in operative proximity to each other, a metal wire coupled to said movable electrode so as to vary the distance between said first and second electrodes in response to a variation in the length of the wire, means responsive to the mean value of an electric control quantity appearing at said work area for producing a proportional current flow in said wire which heats said wire to vary its length and adjust the gap between said electrodes so as to maintain a predetermined minimum separation between said electrodes throughout the entire operative period of said apparatus, and electromagnetic vibrator means coupled to said movable electrode for imparting a vibratory motion of small amplitude thereto which is independent of the movement of said movable electrode produced by said metal wire.

3. Spark erosion apparatus comprising a first electrode, a second electrode workpiece, at least one of said electrodes being movable, means for positioning one of said electrodes in operative proximity to the other electrode to define a gap work area, a source of electrical energy, means for coupling said energy source to said first and second electrodes in a manner to produce a plurality of repeated spark discharges therebetween when said electrodes are positioned in operative proximity to each other, a metal wire coupled to said movable electrode so as to vary the distance between said first and second electrodes in response to a variation in the length of the wire, means responsive to the mean value of the work area current for producing a current flow in said wire which varies inversely with said work area current and heats said wire to vary its length and adjust the gap between said electrodes so as to maintain a predetermined minimum separation between said electrodes throughout the entire operative period of said apparatus, and electromagnetic vibrator means coupled to said movable electrode for imparting a vibratory motion of small amplitude thereto which is independent of the movement of said movable electrode produced by said metal wire.

4. Spark erosion apparatus comprising a first electrode, a second electrode workpiece, at least one of said electrodes being movable, a source of electrical energy, means for coupling said energy source to said first and second electrodes, means for positioning said first and second electrodes relative to one another to establish a plurality of rapidly repeated electric spark discharges therebetween of a given frequency, means responsive to the mean current flowing through said electrodes for moving said first electrode with respect to said second electrode to maintain a uniform gap therebetween, said moving means comprising a metal wire coupled to the movable electrode and arranged to conduct a heating current which varies with the magnitude of said electrode current thereby to vary the length of said wire which in turn moves said movable electrode, and electromagnetic vibrator means coupled to said movable electrode to cause vibrations therein which cylically vary the distance between said electrodes at a frequency which is independent of the frequency of said electric discharges.

5. Spark erosion apparatus comprising a first electrode, a second electrode workpiece, at least one of said electrodes being movable, a source of electrical energy, means for coupling said energy source to said first and second electrodes, means for positioning said first and second electrodes relative to one another to establish a plurality of rapidly repeated electric spark discharges therebetween of a given frequency, means responsive to the mean current flowing through said electrodes for moving said first electrode with respect to said second electrode to maintain a uniform gap therebetween, said moving means comprising a metal wire coupled to the movable electrode and arranged to conduct a heating current which varies with the magnitude of said electrode current thereby to vary the length of said wire which in turn moves said movable electrode, and electromagnetic vibrator means coupled to said movable electrode to cause vibrations therein of an amplitude which is a small fraction of the spark gap, the frequency of said vibrations being independent of the frequency of said electric discharges.

References Cited

UNITED STATES PATENTS

| | | | |
|---|---|---|---|
| 255,466 | 3/1882 | Siemens | 314—90 X |
| 2,794,110 | 5/1957 | Griffith | 219—69 |
| 2,796,509 | 6/1957 | Blake | 219—69 |

JOSEPH V. TRUHE, *Primary Examiner.*